United States Patent
Parikh et al.

(10) Patent No.: US 8,095,540 B2
(45) Date of Patent: Jan. 10, 2012

(54) IDENTIFYING SUPERPHRASES OF TEXT STRINGS

(75) Inventors: Jignashu Parikh, Bangalore (IN); Narayan L. Bhamidipati, Bangalore (IN); Rajesh Parekh, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 678 days.

(21) Appl. No.: 12/104,168

(22) Filed: Apr. 16, 2008

(65) Prior Publication Data

US 2009/0265303 A1 Oct. 22, 2009

(51) Int. Cl.
*G06F 17/30* (2006.01)
(52) U.S. Cl. ........................................ 707/741
(58) Field of Classification Search ........... 707/759, 707/768, 736, 741
See application file for complete search history.

(56) References Cited

U.S. PATENT DOCUMENTS

| | | | |
|---|---|---|---|
| 5,544,355 A * | 8/1996 | Chaudhuri et al. | 1/1 |
| 7,200,587 B2 * | 4/2007 | Matsubayashi et al. | 707/758 |
| 7,558,778 B2 * | 7/2009 | Carus et al. | 1/1 |
| 2007/0016563 A1 * | 1/2007 | Omoigui | 707/3 |
| 2007/0294200 A1 * | 12/2007 | Au | 706/55 |
| 2008/0082477 A1 * | 4/2008 | Dominowska et al. | 707/1 |
| 2009/0094207 A1 * | 4/2009 | Marvit et al. | 707/3 |
| 2009/0099996 A1 * | 4/2009 | Stefik | 706/54 |
| 2009/0287668 A1 * | 11/2009 | Evans et al. | 707/4 |

OTHER PUBLICATIONS

Emmanuel Chieze, Evaluation of a practical method for improving Web search results, Apr. 2006, pp. 1-8.*

* cited by examiner

*Primary Examiner* — James Trujillo
*Assistant Examiner* — Jorge A Casanova
(74) *Attorney, Agent, or Firm* — Weaver Austin Villeneuve and Sampson LLP

(57) ABSTRACT

Methods and apparatus are described by which "superphrases" of "seed phrases" representing basic concepts may be identified without having to compare all possible pairs of seed and candidate phrases. According to one class of embodiments, a data structure similar to an inverted index is used for indexing phrases. The elimination of seed and candidate phrase pairs is enabled by building and traversing the index in a particular manner.

14 Claims, 3 Drawing Sheets

IDENTIFYING SUPERPHRASES OF TEXT STRINGS

BACKGROUND OF THE INVENTION

The present invention relates to automated processing of text strings and, in particular, to techniques for identifying superphrases of text strings.

Automated extraction of the key concepts contained in a string of text is a challenging problem. Words present in such a string may provide clues as to what the string is about, but prior knowledge regarding the concepts represented by those words is typically required. This is an issue in a variety of contexts including, for example, the field of automated search in which text strings, i.e., search queries, are matched to documents using a wide variety of techniques. The problem arises because of the lack of constraints imposed on users generating queries. That is, different users looking for documents relating to the same subject matter may submit radically different queries which nevertheless represent the same underlying concept(s). And while the mapping to underlying concepts might be readily apparent to a human, conventional applications which employ an automated approach to parsing and responding to search queries are not capable of appreciating such connections.

SUMMARY OF THE INVENTION

According to the present invention, automated text processing techniques are provided which may be used to enhance a variety of other techniques and services. According to one class of embodiments, methods and apparatus are provided for identifying superphrases in a set of candidate phrases with reference to a set of seed phrases. Each of the candidate phrases includes one or more candidate phrase words. Each of the seed phrases includes one or more seed phrase words. All distinct ones of the seed phrase words in the set of seed phrases are sorted. Each seed phrase in the set of seed phrases is indexed by sorting the corresponding seed phrase words, and indexing the seed phrase with reference to the sorted distinct seed phrase words. It is determined whether each candidate phrase is a superphrase of one or more of the seed phrases by sorting only the corresponding candidate phrase words included among the distinct seed phrase words, and determining whether all of the seed phrase words of any of the indexed seed phrases are included among the sorted candidate phrase words.

According to another class of embodiments, methods and apparatus are provided for rewriting search queries with reference to a set of seed queries. It is determine whether a first search query includes one or more of the seed queries. Where the first search query includes a first one of the seed queries, the first search query is reformulated as a rewritten search query which represents different matching requirements for corresponding subsets of terms included in the rewritten search query. Search results are generated with reference to the rewritten search query in response to the first search query.

According to yet another class of embodiments, methods and apparatus are provided for responding to search queries. Presentation of search results in an interface is facilitated in response to a first search query. The search results were generated with reference to a rewritten search query which corresponds to a reformulation of the first search query. The rewritten search query represented different matching requirements for corresponding subsets of terms included in the rewritten search query. A first one of the subsets of terms included in the rewritten search query corresponded to a seed query contained within the first search query.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Search technologies, e.g., Web search engines, can employ a variety of metrics and techniques to identify documents matching a given query. Many technologies employ one or more of title match, abstract match, and/or full text match to identify relevant documents. Use of title match (i.e., all query terms must be in the title of matching document) by itself can be effective, but may miss many relevant documents, particularly where the query contains extraneous terms. On the other hand, relying on abstract or full text matching (i.e., widening the corpus of text in which the query terms can exist) can result in identification of irrelevant articles, and therefore a correspondingly negative user experience. An example will be instructive.

In 2007, the AFC Asian Cup, Asia's most prestigious soccer tournament, was hosted by Vietnam, Indonesia, Malaysia, and Thailand. During the relevant time period, a title match search for the query "asian cup" matched 254 news articles. However, title match searches for "asian cup 2007," "asian cup 07," and "vietnam asian cup 2007" resulted in a total of zero matching news articles, while "vietnam asian cup" matched only 23 news articles. Obviously title match searching was too restrictive, resulting in many relevant articles being missed. However, the number of false positives resulting from loosening this requirement (e.g., to include text from the abstract or the bodies of such articles) proved problematic. Embodiments of the invention address this apparent conundrum.

According to the present invention, methods and apparatus are provided by which "superphrases" of "seed phrases" representing basic concepts may be identified without having to compare all possible pairs of seed and candidate phrases. According to one class of embodiments, a data structure similar to an inverted index is used for indexing phrases. The elimination of seed and candidate phrase pairs is enabled by building and traversing the index in a particular manner.

Figure 1:
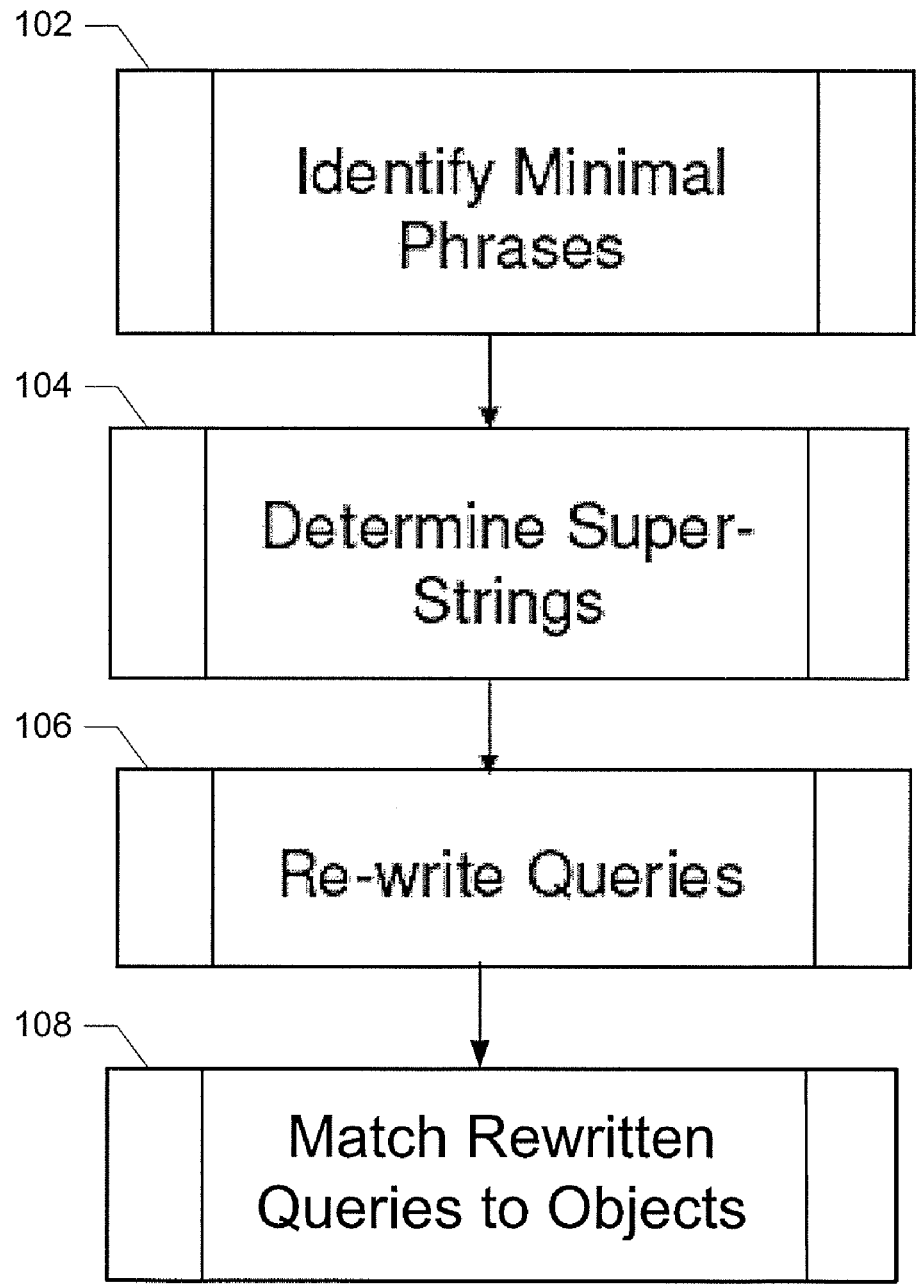
FIG. 1 is a flowchart illustrating operation of a specific embodiment of the invention.

As will be discussed, a particular set of applications of the invention enables the rewriting of search queries to improve coverage, i.e., capture more documents, without sacrificing relevance. An example of such an embodiment will now be described with reference to FIG. 1. It should be noted that the technique illustrated in FIG. 1 is merely an example of a particular application of a much more broadly applicable technique. That is, the identification of superphrases with reference to a set of seed phrases (e.g., minimal queries) in accordance with the invention may be used in various contexts as the basis for a wide variety of applications such as, for example, identifying refinements of search queries, suggesting keyword phrases to advertisers for sponsored search, proposing related search queries to aid users in quickly finding documents they are interested in, clustering related phrases into a single topic and identifying matching documents for that topic, and determining variants of a given product (for example, "canon camera", "canon sd550 camera", "canon powershot camera", "canon powershot sd1000 camera", etc.).

The basic problem of text-based search may be articulated in the following manner. Given a particular string of text, the objective is to find all objects (e.g., documents) which correspond to the underlying concept(s) represented by the string of text. Common shortcomings of conventional approaches to the problem are the under-reporting and over-reporting of matches as described above.

According to the specific embodiment illustrated in FIG. 1, a set of original queries, e.g., as derived from web search logs, is processed to identify a set of "minimal queries" (also referred to herein more generally as "seed phrases") each of which presumably corresponds to the main concept(s) represented by some subset of the set of original queries (102). This is done by identifying all queries in the original set which cannot be reduced (i.e., by removing words) to obtain another one of the queries in the set. So, for example, if a set of queries corresponds to the various asian-cup-related queries described above, the query "asian cup" would be a minimal query in that no words can be removed from the query "asian cup" to obtain any of the other queries in the set.

Once the minimal queries are identified, all queries in the original set which include each minimal query are identified as "superphrases" for that minimal query (104). For example, the queries "asian cup results" and "asian cup 2007" would be identified as superphrases for the minimal query "asian cup." It should be noted that exact matching of the minimal query may not necessarily be required, i.e., the words could be out of order and/or not consecutive.

At least some of the superphrase queries for a given minimal query are then rewritten to enhance the likelihood that objects, e.g., Web documents, corresponding to the basic underlying concept represented by the minimal query are identified (106). This may be done in a variety of ways, but may be generally characterized as imposing different matching requirements on different parts, e.g., different subsets of terms, of a given query.

Returning to our example of the minimal query "asian cup," the superphrase query "asian cup 2007" might be rewritten, for example, such that it could be represented in the following manner: title=asian; title=cup; title+abstract=2007. In other words, both of the strings "asian" and "cup," i.e., the minimal query, must appear in the title of a matching article, while the string "2007" need only appear in either the title or the abstract. It should be noted that the use of title and abstract in this example is not intended to limit the scope of the invention. Other fields or information associated with a particular document may be used in a manner similar to that described above. For example, different matching requirements could be imposed on metadata associated with the document, full text of the document, anchor text of hyperlinks pointing to the document, meta-tags contained in the document, etc.

By keeping matching requirements tight for minimal queries, but loosening them for additional words in the superphrases not included in the minimal query, more objects (e.g., articles, documents, etc.) may be identified (108) without sacrificing relevance.

Figure 2:
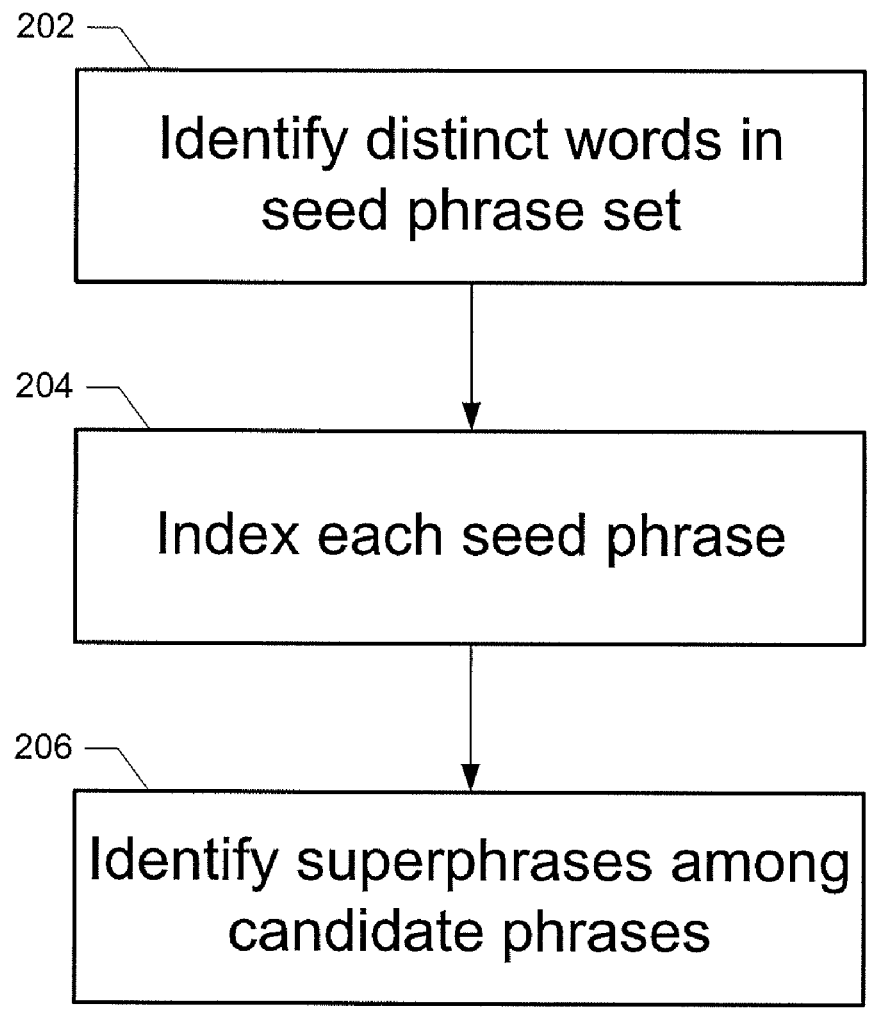
FIG. 2 is a flowchart illustrating operation of another specific embodiment of the invention.

A specific embodiment of a technique for identifying superphrases from seed phrases will now be described with reference to the flowchart of FIG. 2. As will be understood, the depicted technique may be employed in the context of the technique of FIG. 1 to identify queries as superphrases of seed phrases in a set of minimal queries. However, it should again be noted that the technique illustrated in FIG. 2 is more widely applicable.

In this example, the problem being solved may be stated as follows: Given two sets of phrases, i.e., a seed phrase set containing M seed phrases, and a candidate phrase set containing N candidate phrases, find all candidate phrases which are superphrases of some seed phrase. In this example, it may be assumed that the number of seed phrases, M, is small such that it can be stored in the computer's RAM for ready access.

As used herein, the following terms are defined as follows. Phrase: A phrase p is an array or ordered sequence of words p[1], p[2], . . . , p[k], where k is known as the length of the phrase. A seed phrase is a phrase that has already been determined to be representative of a topic or concept. A seed phrase may also be an element of a set of phrases that are representative of a collection of topics or concepts of interest. Superphrase: A phrase p is a superphrase of a phrase q, if the set of words contained in p includes/contains the set of words contained in q as a subset (order independent). Subphrase: q is a subphrase of p, if p is a superphrase of q. Strict superphrase: p is a strict superphrase of q, if p is a superphrase of q and contains more words than q. Minimal phrase: Given a set of phrases Q, q is a minimal phrase in Q, if no other phrase in Q may be obtained by removing some words from q.

Initially, all distinct words in the set of seed phrases are identified (202). According to various embodiments, this may be done by sorting all the words, and storing them in a hashed list (say, W) with the value being the index of the word in sorted order. That is, if w[1]<w[2]< . . . <w[K] are the K distinct words contained in the seed phrase set, $$\text{then } W\{w[i]\}=i \forall 1 \leq i \leq K.$$

Each seed phrase q is then indexed (204). This may be done as follows. The words in q are sorted in lexicographic order and, for ease of notation, the resulting new phrase (with words in sorted order) will also be called q. Let $q[1] \leq q[2] \leq \ldots \leq q[k]$ be the words in q. Seed phrase q is then added to the end of an array indexed by the first word q[1]. This array is called I[W{q[1]}]. Note that, in this case, a hash is not needed here as we use the value of the word in the hashed list instead of the word itself.

For each candidate phrase c, determine whether it is a superphrase of some seed phrase (206). This may be done as follows. The words in the phrase c are sorted, retaining only those words which appear as keys in W, i.e., the hashed list containing the words in the seed phrase set. This new phrase is called p. Let $p[1] \leq p[2] \leq \ldots \leq p[m]$ be the words in p. The following steps, i.e., i-v, are then repeated until either c is found to be a superphrase of some seed phrase q, or p becomes null.

i. Take the first word p[1] in p (in its current form);
    ii. Look up the list of seed phrases available at I[W{p[1]}];
    iii. For each seed phrase q in I[W{p[1]}], check if q is a subphrase of p;
    iv. If some q is found to be a subphrase of p, assert that c is a superphrase of q;
    v. Else remove p[1] from p, shifting the remaining elements of p, so that what was p[i+1] becomes p[i], and m is reduced by 1. If p is null (i.e., m is zero), assert that c is not a superphrase of any of the seed phrases.

Notice that over time, the candidate phrase shrinks in size, in step v above, which relies on the fact that the words in p are sorted. So, when a seed subphrase that starts with p[i] is not found, p[i] may be removed from p without affecting the result, because all seed phrases that would be encountered after this point would certainly not contain p[i].

Since both p and q contain words in sorted order, checking if q is a subphrase of p (e.g., step iii above) is relatively straightforward, and may be performed as described below. As earlier, let q include the words $q[1] \leq q[2] \leq \ldots \leq q[k]$, and p include the words $p[1] \leq p[2] \leq \ldots \leq p[m]$. Note that if m<k, it can trivially be determined that q cannot be a subphrase of p. So, let us assume that $m \geq k$.

Whether q is a subphrase of p is determined as follows. The variables i and j are initialized to 1. The following steps are repeated until i>k, or j>m: While p[j]<q[i], increment j by 1. If p[j]>q[i], set j=m+1. Else (i.e., p[j]=q[i]), increment both i and j by 1.

If i exceeds k, assert q is a subphrase of p. Else assert q is not a subphrase of p.

Note that, by choice (i.e., step ii above), p[1]=q[1]. Let q' be the phrase containing all words in q except q[1]. Similarly, let p' be the phrase containing all words in p except p[1]. The task of checking if q is a subphrase of p boils down to checking if q' is a subphrase of p'. So, without loss of generality, we could have initialized i and j to 2 rather than 1.

Also, the condition j>m may be modified to j>m−k+i, by observing that, for q to be a subphrase of p, there should be more words remaining in p than q at any stage. Since i<k, this loop is bound to terminate no later than when the condition is j>m.

Strict superphrases may be identified in a similar manner with an additional check on the number of words to ensure that the superphrase has more words in it.

In some cases, there may be phrases in the seed phrase set which are superphrases of another seed phrase. If our objective is to only identify a candidate phrase that is a superphrase of some seed phrase, then retaining seed phrases which are themselves (strict) superphrases of other seed phrases is unnecessary. In such a case, we may first run this algorithm with the candidate phrase set being the same as the seed phrase set, whereby all seed superphrases are identified and eliminated. The remaining seed phrases are referred to as "minimal phrases" in the sense that no more words can be removed from these phrases to obtain yet another seed phrase in the set.

Some comments regarding the algorithmic complexity of identifying superphrases according to the technique described above may be instructive. As assumed earlier, let the number of seed and candidate phrases be M and N, respectively (M<N). Assume also that the average phrase length (i.e., the number of words contained in the average phrase) is L. Typically, L<<M. It follows then that, since only the seed phrases are stored in memory, the space complexity is of O(M).

In the example above, the words in each seed phrase are sorted just once while loading into memory. The algorithm runs once for each of the N candidate phrases. Let the candidate phrase be p with words $p[1] \leq p[2] \leq \ldots \leq p[L]$. Note that, given a seed phrase s, identifying if p is a superphrase of s takes O(L) time.

Let the average number of seed phrases in the elements of the index I be J. That is, there are J seed phrases, on the average, beginning with the same word. Now, for each word p[i] in p, we look at all the seed phrases beginning with p[i] to check if any of them is a subphrase of p. Thus, on average, JL seed phrases are checked for being a subphrase of p, and each such check takes O(L) time. Hence, identifying all superphrases among the candidate phrases takes $O(JL^2N)$ time.

Figure 3:
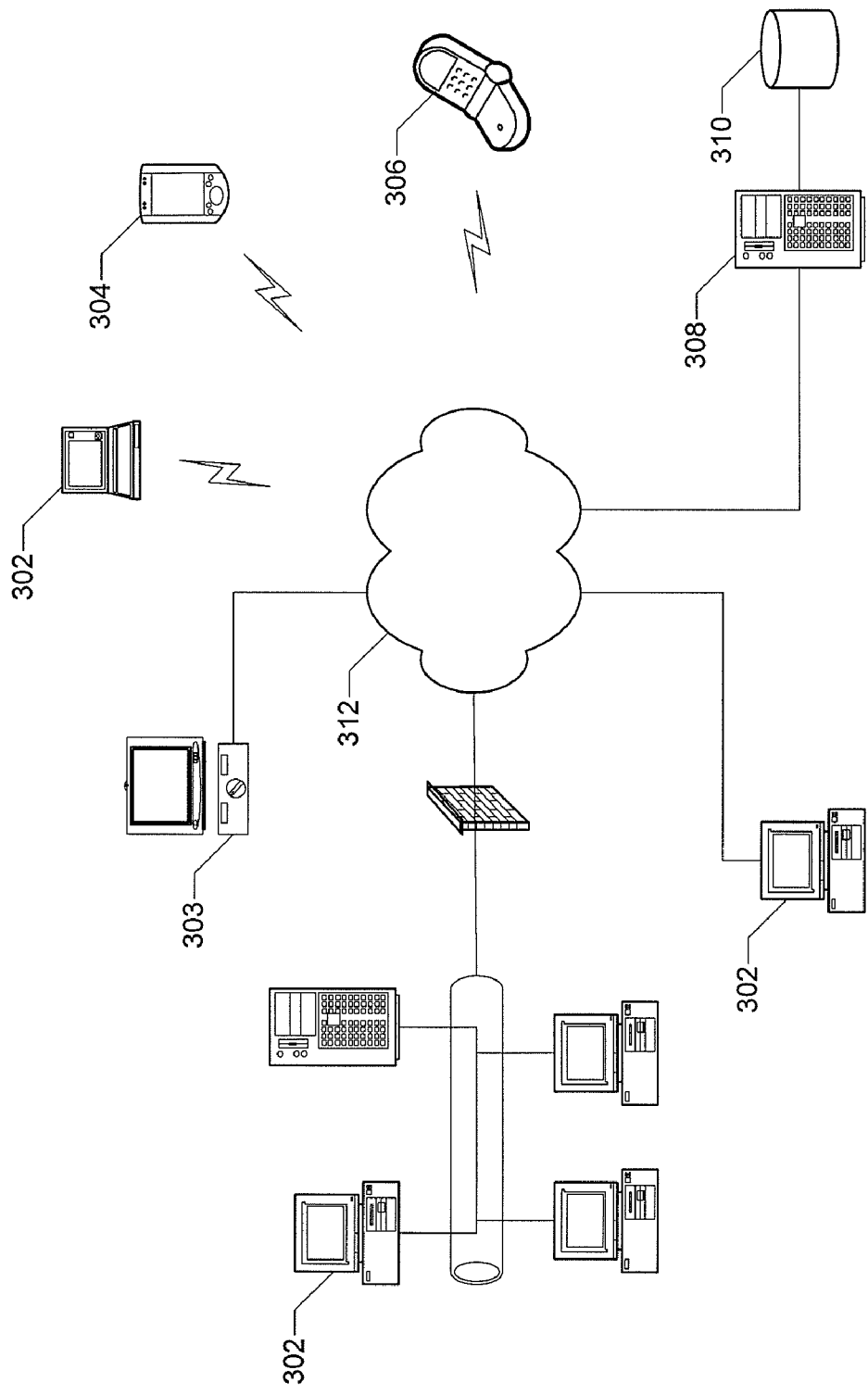
FIG. 3 is a simplified diagram of a computing environment in which embodiments of the present invention may be implemented.

Embodiments of the present invention may be employed to facilitate identification of superphrases in any of a wide variety of computing contexts. For example, as illustrated in FIG. 3, implementations relating to the use of superphrase identification in the rewriting of search queries are contemplated in which the relevant population of users interacts with a diverse network environment via any type of computer (e.g., desktop, laptop, tablet, etc.) 302, media computing platforms 303 (e.g., cable and satellite set top boxes and digital video recorders), handheld computing devices (e.g., PDAs, email clients, etc.) 304, cell phones 306, or any other type of computing or communication platform.

Once collected, the various data employed by embodiments of the invention (e.g., search queries) may be processed in some centralized manner. This is represented in FIG. 3 by server 308 and data store 310 which, as will be understood, may correspond to multiple distributed devices and data stores. Search results (generation of which is enhanced by techniques enabled by the present invention) may then be provided to users in the network via the various channels with which the users interact with the network. Various aspects of the invention may be practiced in a wide variety of network environments (represented by network 312) including, for example, TCP/IP-based networks, telecommunications networks, wireless networks, etc.

In addition, the computer program instructions and data structures with which embodiments of the invention are implemented may be stored in any type of non-transitory computer-readable media, and may be executed according to a variety of computing models including a client/server model, a peer-to-peer model, on a stand-alone computing device, or according to a distributed computing model in which various of the functionalities described herein may be effected or employed at different locations. A particular implementation of the invention employed standard techniques such as hash lists, arrays, and efficient inverted index data structures. The implementation was coded in Perl and data were stored on a network file storage device.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for identifying superphrases in a set of candidate phrases with reference to a set of seed phrases, each of the candidate phrases comprising one or more candidate phrase words, and each of the seed phrases comprising one or more seed phrase words, the method comprising:
   sorting all distinct ones of the seed phrase words in the set of seed phrases;
   indexing each seed phrase in the set of seed phrases by sorting the corresponding seed phrase words, and indexing the seed phrase with reference to the sorted distinct seed phrase words; and
   determining whether each candidate phrase is a superphrase of one or more of the seed phrases by sorting only the corresponding candidate phrase words included among the distinct seed phrase words, and determining whether all of the seed phrase words of any of the indexed seed phrases are included among the sorted candidate phrase words, wherein the candidate phrase is a superphrase based on the determination that all the seed phrase words of any of the indexed seed phrases are included among the sorted candidate phrase words.

2. The method of claim 1 wherein the set of seed phrases is configured such that no seed phrase in the set of seed phrases can be derived by removal of one or more words from any of the other seed phrases in the set of seed phrases.

3. The method of claim 1 wherein at least one of the seed phrases in the set of seed phrases includes all of the seed phrase words of another one of the seed phrases in the set of seed phrases.

4. The method of claim 1 further comprising generating the set of seed phrases from a set of search queries.

5. The method of claim 1 wherein each candidate phrase corresponds to a search query, the method further comprising reformulating a first one of the candidate phrases corresponding to a first search query as a rewritten search query where the first candidate phrase is found to be a superphrase of one or more of the seed phrases.

6. The method of claim 5 wherein the rewritten search query represents different matching requirements for corresponding subsets of the candidate phrase words included in the rewritten search query.

7. The method of claim 5 further comprising generating search results with reference to the rewritten search query in response to the first search query.

8. A computer program product for identifying superphrases in a set of candidate phrases with reference to a set of seed phrases, each of the candidate phrases comprising one or more candidate phrase words, and each of the seed phrases comprising one or more seed phrase words, the computer program product comprising at least one computer-readable medium having computer program instructions stored therein configured to enable at least one computing device to:
   sort all distinct ones of the seed phrase words in the set of seed phrases;
   index each seed phrase in the set of seed phrases by sorting the corresponding seed phrase words, and indexing the seed phrase with reference to the sorted distinct seed phrase words; and
   determine whether each candidate phrase is a superphrase of one or more of the seed phrases by sorting only the corresponding candidate phrase words included among the distinct seed phrase words, and determining whether all of the seed phrase words of any of the indexed seed phrases are included among the sorted candidate phrase words, wherein the candidate phrase is a superphrase based on the determination that all the seed phrase words of any of the indexed seed phrases are included among the sorted candidate phrase words.

9. The computer program product of claim 8 wherein the set of seed phrases is configured such that no seed phrase in the set of seed phrases can be derived by removal of one or more words from any of the other seed phrases in the set of seed phrases.

10. The computer program product of claim 8 wherein at least one of the seed phrases in the set of seed phrases includes all of the seed phrase words of another one of the seed phrases in the set of seed phrases.

11. The computer program product of claim 8 wherein the computer program instructions are further configured to enable the at least one computing device to generate the set of seed phrases from a set of search queries.

12. The computer program product of claim 8 wherein each candidate phrase corresponds to a search query, and wherein the computer program instructions are further configured to enable the at least one computing device to reformulate a first one of the candidate phrases corresponding to a first search query as a rewritten search query where the first candidate phrase is found to be a superphrase of one or more of the seed phrases.

13. The computer program product of claim 12 wherein the rewritten search query represents different matching requirements for corresponding subsets of the candidate phrase words included in the rewritten search query.

14. The computer program product of claim 12 wherein the computer program instructions are further configured to enable the at least one computing device to generate search results with reference to the rewritten search query in response to the first search query.

* * * * *